United States Patent

Ritzen et al.

[11] Patent Number: 6,128,473
[45] Date of Patent: Oct. 3, 2000

[54] METHOD FOR FREQUENCY PLAN REVISION WITHIN A CELLULAR TELEPHONE SYSTEM USING DOWNLINK INTERFERENCE ESTIMATES

[75] Inventors: Benny Ritzen, Stockholm; Matts Sporre, Älta, both of Sweden

[73] Assignee: Telefonaktiebolaget LM Ericsson (publ), Stockholm, Sweden

[21] Appl. No.: 08/996,267

[22] Filed: Dec. 22, 1997

[51] Int. Cl.[7] ................................... H04Q 7/00
[52] U.S. Cl. .................. 455/63; 455/67.3; 455/446; 455/513
[58] Field of Search ................... 455/423, 446, 455/452, 437, 513, 67.3, 63, 511

[56] References Cited

U.S. PATENT DOCUMENTS

| | | | |
|---|---|---|---|
| 5,375,123 | 12/1994 | Andersson et al. | 370/95.1 |
| 5,428,818 | 6/1995 | Meidan et al. | 455/33.3 |
| 5,491,837 | 2/1996 | Haartsen | 455/62 |
| 5,574,974 | 11/1996 | Algren et al. | 455/33.1 |
| 5,722,073 | 2/1998 | Wallstedt et al. | 455/437 |
| 5,787,352 | 7/1998 | Benveniste | 455/452 |

FOREIGN PATENT DOCUMENTS

WO 96/31989  10/1996  WIPO.
WO 97/39598  10/1997  WIPO.

OTHER PUBLICATIONS

EPO Search Report, Sep. 9, 1998, File No. RS 100549 US.

*Primary Examiner*—Daniel S. Hunter
*Assistant Examiner*—Thuan T. Nguyen
*Attorney, Agent, or Firm*—Jenkens & Gilchrist, PC

[57] ABSTRACT

Downlink interference on highly uplink interfered allocated frequencies and corresponding candidate frequencies for reallocation is estimated. The estimates are then utilized to narrow the number of candidate frequencies and highly interfered frequencies to be considered for reallocation. The estimation of downlink interference on a selected frequency is made by having a mobile station measure signal strength on the control channel frequencies of neighboring cells which are allocated that selected frequency. From these measurements, a signal strength histogram is generated for each neighboring cell, and a percentile value is calculated for each histogram. These percentile values for the neighboring cells, minus a selected delta value (where appropriate), are then summed to generated a value estimating the downlink interference for the selected frequency. The selected delta value is applied where the selected frequency in the neighboring cell comprises a traffic channel frequency.

24 Claims, 4 Drawing Sheets

METHOD FOR FREQUENCY PLAN REVISION WITHIN A CELLULAR TELEPHONE SYSTEM USING DOWNLINK INTERFERENCE ESTIMATES

BACKGROUND OF THE INVENTION

1. Technical Field of the Invention

The present invention relates to cellular telephone systems and, in particular, to a method for allocating frequencies to individual cells of a cellular telephone system.

2. Description of Related Art

Cellular telephone systems divide a large service area into a number of smaller discrete geographical areas called "cells" each typically ranging in size from about one-half to about twenty kilometers in diameter. Each cell is at least contiguous and/or overlapping with multiple adjacent cells to provide substantially continuous coverage throughout the service area. A base station including a plurality of transceivers capable of operating independently on different assigned radio frequencies is provided for each of the cells. Via the transceivers, the base stations engage in simultaneous communications with plural mobile stations operating within the area of the associated cell. The base stations further communicate via data links and voice trunks with a central control station, commonly referred to as a mobile switching center, which functions to selectively connect telephone calls to the mobile stations through the base stations and, in general, control operation of the system.

Each cell is allocated use of a predetermined set of frequencies from the cellular frequency band for use in providing its control and voice/data (traffic) channels. The allocation is typically made in accordance with a certain frequency plan. The frequencies used for the control and traffic channels assigned to a given cell are preferably spaced apart from each other across the frequency spectrum of the cellular frequency band. This serves to minimize the instances and adverse affects of adjacent channel interference.

Because only a limited number of frequencies are available in the cellular frequency band, the same frequencies that are allocated to one cell are also allocated to (i.e., reused by) other cells in distant parts of the service area. Typically, adjacent cells are not allocated to use the same frequency by the frequency plan. Furthermore, the power levels of the signal transmissions on any given frequency are limited in strength so as to limit propagation beyond the cell area. The foregoing precautions serve to reduce instances of co-channel interference caused by reuse of that same frequency in a distant cell. It is further noted that careful power level and distance allocation also assists in reducing instances of adjacent channel interference.

In spite of the precautions taken by service providers in the frequency plan allocation for a frequency reuse cellular telephone system and in the regulation of system operation, it is known that instances of co-channel interference do occur. This interference may be affected by a number of factors including: terrain irregularities; radio propagation changes; fading; multipath propagation; sectorization; reflection; existence of human and natural obstructions; the number of available transceivers per cell; and variations in demand. This interference often adversely affects system operation by, for example, degrading voice quality on the traffic channels or interfering with the transmission and reception of control signals on the control channels. Service providers accordingly invest a substantial amount of effort in frequency planning for optimal system operation.

The conventional frequency planning process utilizes software tools for predicting, for each frequency, the interference resulting from concurrent use of that frequency by other cells. This process is implemented by the service provider not only when the system is initially set up, but also at each instance thereafter when new cells or equipment are added. The interference predictions made by the frequency planning software tools rely on certain wave propagation models and other theoretical considerations. It is often difficult to construct a reasonably accurate wave propagation model and take into account other theoretical considerations for complicated environments (such as urban areas) which are subject to the effects of terrain irregularities, multipath propagation, sectorization, reflection and the existence of obstructions. Accordingly, software tool directed frequency planning alone (i.e., without the support of the cellular telephone system) is of limited practical benefit in many cases.

A substantial amount of effort has been directed toward involving the cellular telephone system itself in the frequency planning process. These efforts have primarily focused on collecting more and more interference related information from the system for service provider analysis and use in determining an optimal speech quality frequency plan. For example, service providers now routinely program their cellular telephone systems to have base stations make and report uplink signal strength measurements on an idle frequency by frequency basis. The collected uplink idle frequency signal strength measurements are indicative of the uplink interference on each frequency, and the measurements accordingly provide valuable information useful in identifying shortcomings of an existing frequency plan and proposing needed reallocations.

The most recent evolution in frequency planning is a concept for supporting a more or less automatic frequency planning scheme implemented by the cellular communications system itself with a minimum of service provider management and oversight. This concept is generally referred to as adaptive frequency allocation (AFA). The basic operation of the adaptive frequency allocation concept is to measure the interference in all cells and on all frequencies, and then utilize the measured data to iteratively reallocate frequencies within the cellular communications system to provide for optimal speech quality. Reallocation decisions may take into account either the interference in a single cell (providing a "localized" approach) or the interference in a number of cells (providing a "centralized" approach).

Situations often arise where the signal strength measurements indicative of uplink interference are misleading. For example, due to the directional nature of the antennas utilized in sectorized cellular systems, the uplink on a given frequency might indicate little interference concerns while the downlink is severely interfered due to the directional broadcasts from a neighboring cell. The making of frequency allocation decisions, especially when using an adaptive frequency allocation scheme, based solely on uplink signal strength measurements is accordingly not recommended.

It is preferred that both uplink and downlink interference be measured and considered in the context of any frequency allocation determination. A number of limitations arise when attempting to collect downlink interference information. Ideally, and conveniently, the downlink interference measurements should be made by mobile stations operating within the cellular communications system. Current system specifications (such as that defined for the Global System for Mobile (GSM) communications) support mobile station downlink signal strength measurements only on those broadcast control channel (BCCH) frequencies of neighboring cells specified by a mobile station received neighbor (BA) list. These measurements provide some information indicative of downlink interference on those frequencies. No support, however, is provided for the mobile station making downlink interference measurements on the BCCH frequency allocated to the currently serving cell as the mobile station cannot separate emissions from its own cell from the emissions of other cells. There is a need for a mechanism to collect downlink interference information for general use in frequency planning, and in particular for use in connection with adaptive frequency allocation schemes.

SUMMARY OF THE INVENTION

To address the foregoing and other concerns, the present invention comprises a method for estimating downlink interference. A given frequency ($f_{sel}$) is selected. All neighboring cells close to a given cell which have currently been allocated use of the selected frequency $f_{sel}$ are then identified. A measurement list is then created containing the broadcast control channel (BCCH) frequencies ($f_{BCCH}$) of each of the identified neighboring cells, and sent to a certain mobile station located in the given cell. The certain mobile station then makes signal strength measurements on the measurement list identified broadcast control channel frequencies $f_{BCCH}$. These signal strength measurements are next processed to generate a signal strength histogram for each of the identified neighboring cells. A selected percentile value is then calculated for each histogram. From these percentile values, a sum is calculated which represents (i.e., estimates) the downlink interference for the selected frequency $f_{sel}$. If the selected frequency $f_{sel}$ in the neighboring cell comprises the broadcast control channel frequency $f_{BCCH}$ for that cell, the corresponding percentile value of the histogram is added to the sum. If the selected frequency $f_{sel}$ in the neighboring cell comprises traffic channel frequency $f_{TCH}$, on the other hand, the percentile value of the histogram minus an appropriate delta value ($\Delta$) is added to the sum.

The present invention further comprises a method for adaptive channel allocation. Uplink idle frequency signal strength measurements are made and processed to identify highly interfered frequency allocations in a current frequency plan as well as identify candidate frequencies for reallocation. Next, for each identified highly interfered frequency, as well as on each of the candidate frequencies, an estimation is made of the downlink interference on that frequency. These estimations are then utilized to narrow the number of candidate frequencies and highly interfered frequencies that should be considered for immediate reallocation. Finally, the identified best reallocations, that can be simultaneously expected, are implemented by the system.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

A cellular service area can cover a large geographic region, and in many instances there will be a need for a large number of cells. Often times, the number of cells needed exceeds the number of cells capable of being provided for by dividing the available frequencies amongst the cells in such a manner as to handle expected subscriber usage per cell. In such a case there are simply not enough frequencies in the cellular frequency band for unique assignment to the included cells. In order to provide sufficient call handling capacity throughout the service area, the cells are typically grouped into clusters of cells and the frequencies in the cellular frequency band are divided amongst and reused in each of the clusters in accordance with a certain frequency assignment plan.

Figure 1:
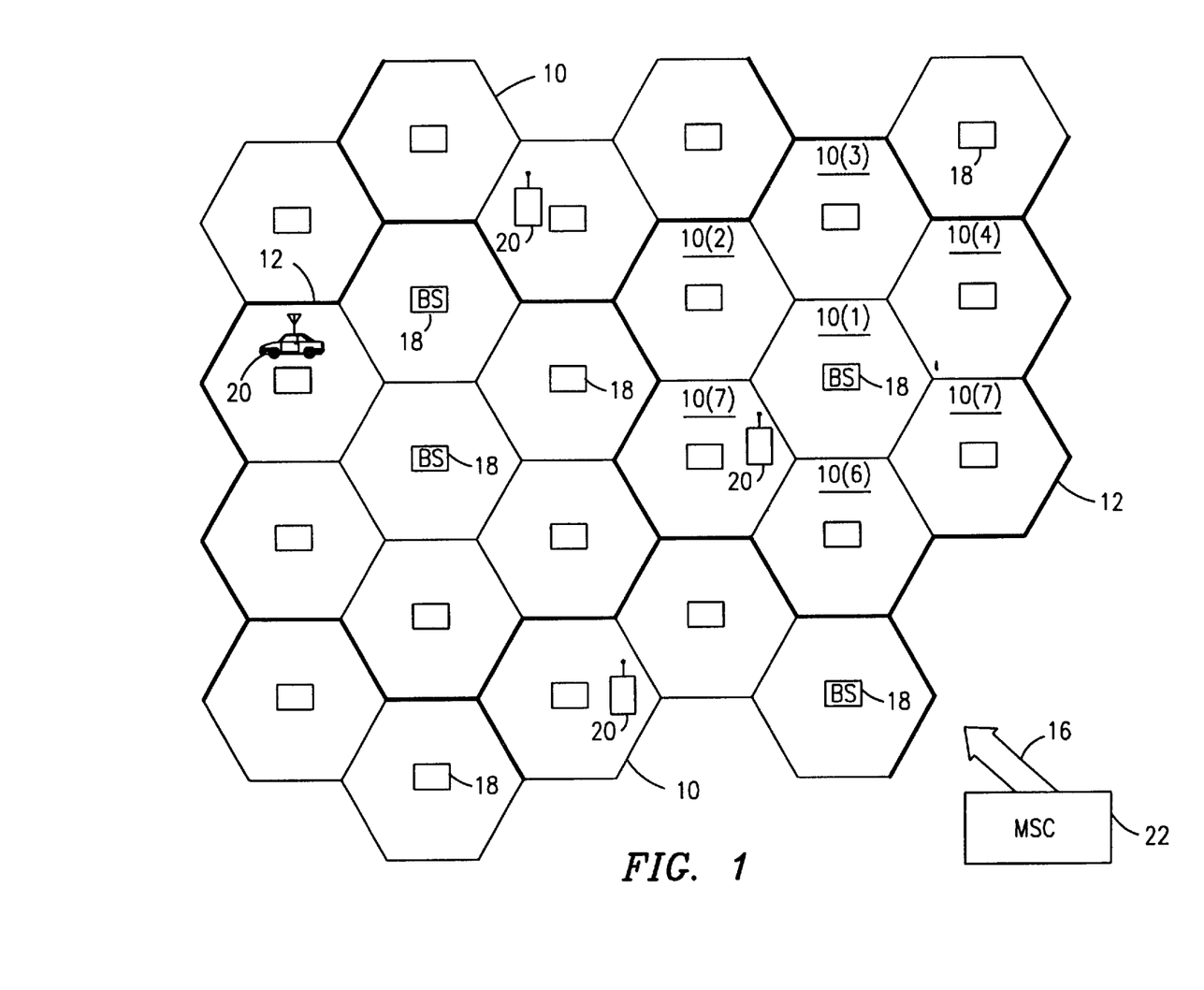
FIG. 1 is a cell diagram schematically illustrating frequency plan assignment within a frequency reuse cellular telephone system.

Reference is now made to FIG. 1 wherein there is illustrated an exemplary cell structure and frequency plan assignment for use in a radio frequency reuse cellular telephone system. An arbitrary geographic region (hereinafter "the service area") is divided into a plurality of contiguous cells 10 schematically represented by hexagons. The cells 10 are then grouped into clusters 12 (outlined in bold to ease recognition). For example, in the frequency plan of FIG. 1, each cluster 12 includes seven cells 10(1)–10(7). It will, of course, be understood that each cluster 12 may have more or less cells 10 as required by the selected frequency plan.

The available frequencies in the cellular frequency band are allocated in accordance with the frequency plan amongst the cells 10 of each cluster 12 such that the radio frequencies of the cellular band are reused in each cluster. It will be noted that in such a frequency plan, adjacent cells are typically not assigned use of the same frequency. Reuse of an identical frequency in the service area is preferably made with a separation of at least more than one cell 10 along with a regulation of broadcast power from each cell to constrain radio propagation substantially within the cell area. Furthermore, it will be noted that typically no one cell 10 utilizes adjacent frequencies in the cellular band. Adjacent frequencies are preferably assigned no closer than one cell 10 away from each other. By arranging the cells 10 in clusters 12 as shown in FIG. 1, regulating broadcast power of communications within the cell as mentioned above, and further by assigning frequencies in the fashion mentioned above, the likelihood of interference is reduced while simultaneously providing effective cellular communications services across a very large service area.

Each of the cells 10 in a cellular telephone system such as that illustrated in FIG. 1 includes at least one base station (BS) 18 configured to facilitate radio frequency communications with mobile stations 20 moving throughout the service area. The base stations 18 are illustrated as being positionally located at or near the center of each of the cells 10. However, depending on geography and other known factors, the base stations 18 may instead be located at or near the periphery of, or otherwise away from the centers of, each of the cells 10. In such instances, the base stations 18 may broadcast and communicate with mobile stations 20 located within the cells 10 using directional rather than omnidirectional antennas. The base stations 18 are connected by communications links (generally shown by arrow 16) to at least one mobile switching center (MSC) 22 operating to control the operation of the system for providing cellular communications with the mobile stations 20. Each base station 18 includes a plurality of transceivers (not shown) capable of operating independently on different radio frequencies assigned to the cell. Operation of the mobile switching center 22 and base station 18 to provide cellular telephone service is well known to those skilled in the art, and will not be described.

In spite of the precautions taken to avoid interference, it is known that interference does occur in cellular systems like that previously described. One aspect of this interference originates from adjacent frequency communications occurring simultaneously in cells 10 of the same or other clusters 12 (i.e., adjacent channel interference). Another aspect of this interference originates from same frequency communications occurring simultaneously in the cells 10 of other clusters 12 (i.e., co-channel interference). To combat this interference, the cellular service provider often engages in occasional revisions of the frequency plan wherein one or more frequencies allocated to a cell 10 are dropped in favor of the addition of one or more other frequencies contained within the cellular band. In this regard, the frequencies in a frequency group 14 allocated by a current version of the frequency plan to a given cell comprise "selected" frequencies with respect to that given cell, and all other frequencies in the cellular band, which are normally selected frequencies for other cells, comprise "candidate" frequencies that could possibly be allocated to that given cell as a result of the revision in the frequency plan. The point of the revision then is to delete one or more of the selected frequencies for a cell which are interfered, and assign in place thereof a corresponding one or more un-interfered or less-interfered candidate frequencies.

Figure 2:
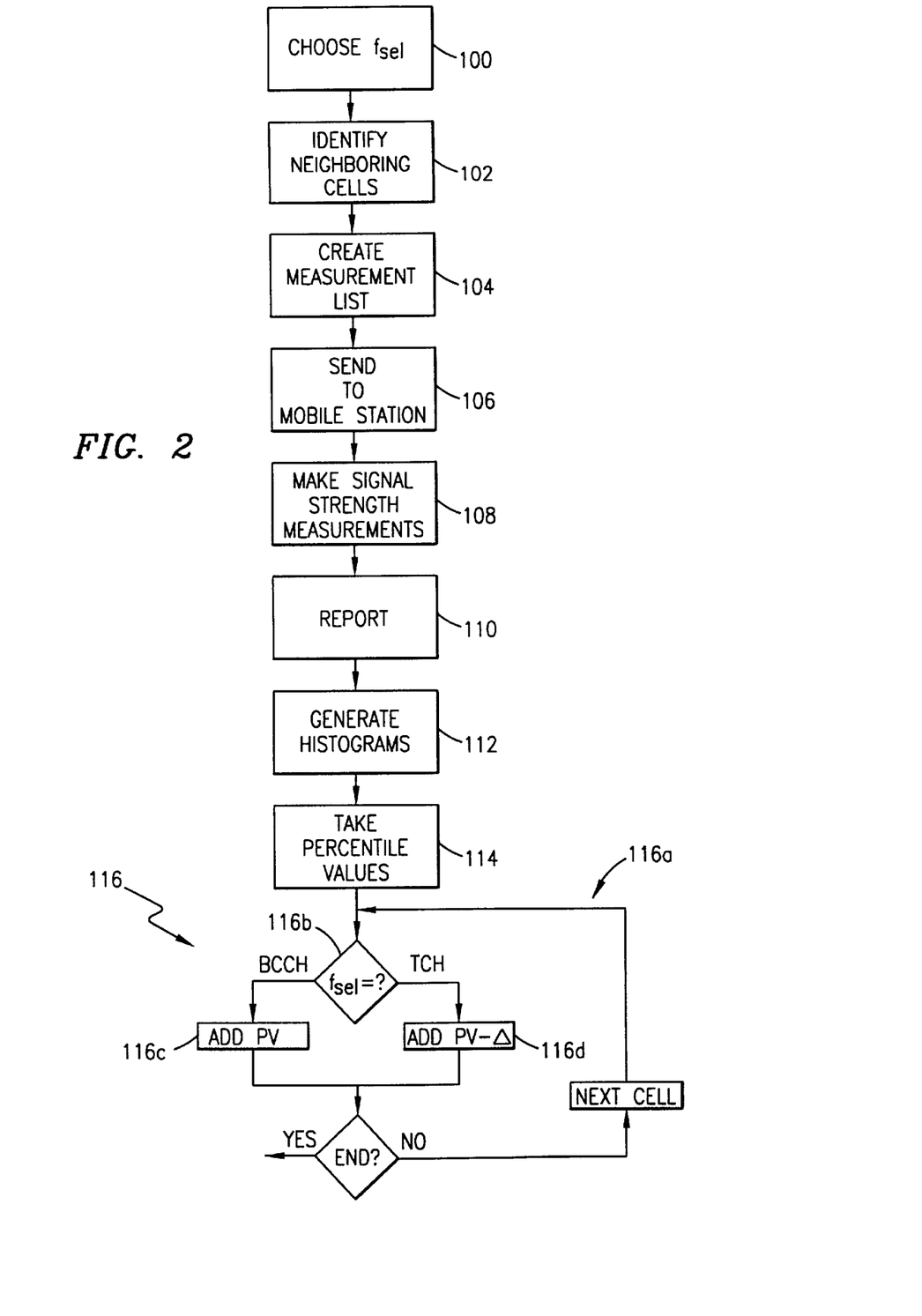
FIG. 2 is a flow diagram for a procedure of the present invention for estimating downlink interference.

Reference is now made to FIG. 2 wherein there is shown a flow diagram for a procedure of the present invention for estimating downlink interference. In step 100, a given frequency ($f_{sel}$) of the cellular frequency band is selected by, as an example, the mobile switching center or other administrative node of the cellular system. This selected frequency is carefully chosen such that it is not allocated to a given cell wherein a certain mobile station to be used for downlink measurements is located. Next, in step 102, all neighboring cells close by the given cell which have currently been allocated use of the selected frequency $f_{sel}$ are identified. By "close by" it is meant, for example, within a selected threshold radial distance from the given cell. A measurement list for the certain mobile station is then created in step 104 containing the broadcast control channel (BCCH) frequencies ($f_{BCCH}$) of each of the identified neighboring cells. The measurement list is then sent through the base station for the given cell to the certain mobile station in step 106. Responsive thereto, the certain mobile station makes signal strength measurements in step 108 on the broadcast control channel frequencies $f_{BCCH}$ of the neighboring cells identified within the measurement list. These signal strength measurements are next reported back through the base station to the mobile switching center (or administrative node) in step 110. The reported signal strength measurements are then processed in step 112 to generate a signal strength histogram for each of the identified neighboring cells. A selected percentile value is then calculated in step 114 for each histogram. It is noted here that the same percentile is applied to all histograms. From these percentile values, a sum is calculated in step 116 which represents (i.e., estimates) the downlink interference for the selected frequency $f_{sel}$. This sum is determined by considering all the identified neighboring cells (loop 116a), determining whether the selected frequency $f_{sel}$ in the currently being considered cell comprises the broadcast control channel frequency $f_{BCCH}$ for that cell or is traffic channel (TCH) frequency ($f_{TCH}$) (step 116b), adding the percentile value of the histogram for that cell as it is to the sum (step 116c) if the selected frequency $f_{sel}$ comprises the broadcast control channel frequency $f_{BCCH}$, or adding the percentile value of the histogram for that cell minus an appropriate delta value ($\Delta$) to the sum (step 116d) if the selected frequency $f_{sel}$ comprises the traffic channel frequency $f_{TCH}$. In this instance, the appropriate delta value $\Delta$ represents an average difference in measured in measured signal strength between a broadcast control channel frequency $f_{BCCH}$ and a traffic channel frequency $f_{TCH}$ caused by differences in utilized output power. Although not specifically illustrated, it is understood that the loop 116a includes a step of initializing (to zero) of the sum prior to addition, and a step of testing after each addition for completion of the consideration of each neighboring cell.

Figure 3:
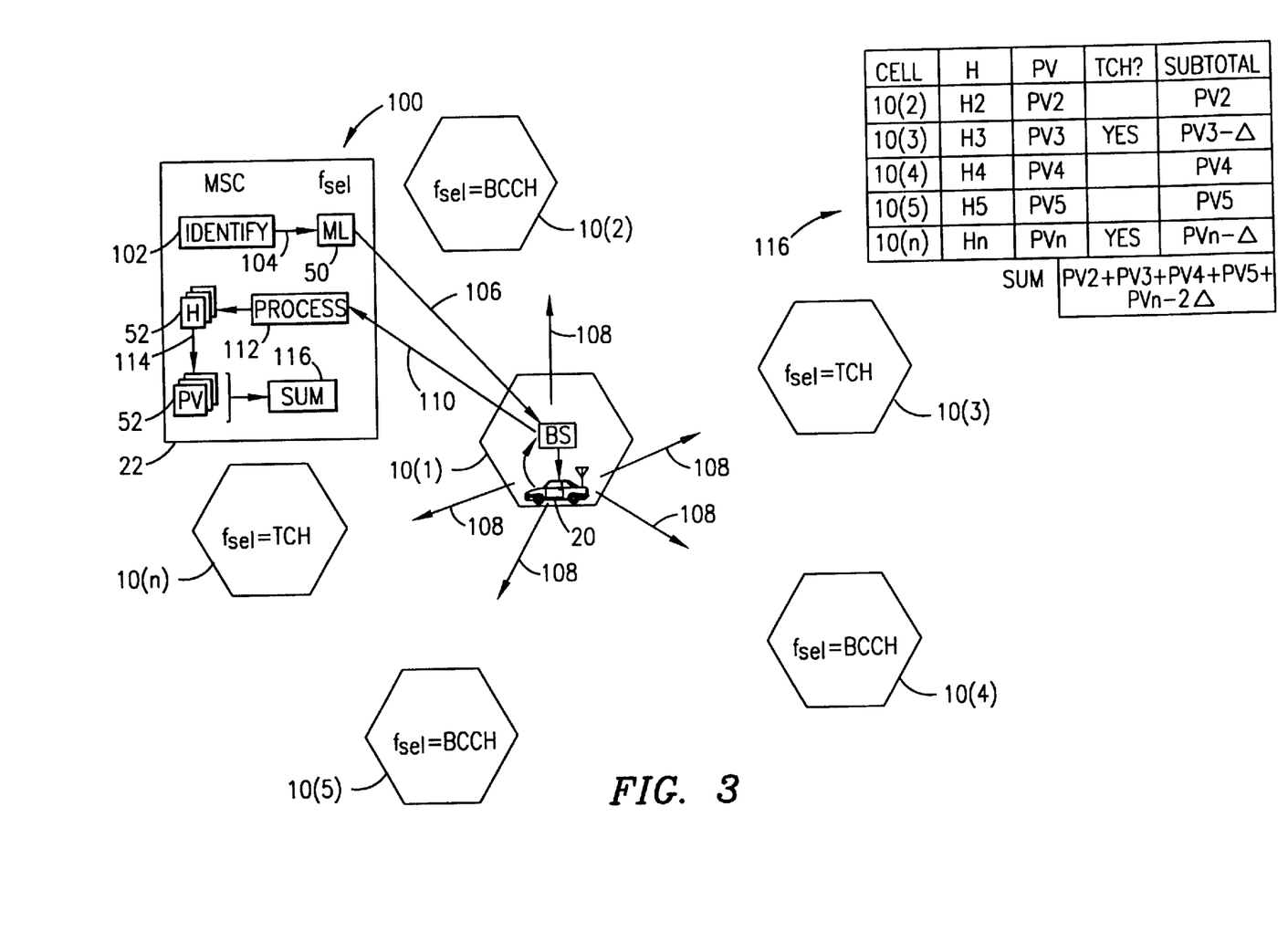
FIG. 3 illustrates an exemplary execution of the procedure of FIG. 2 for estimating downlink interference.

The foregoing process for estimating downlink interference may be better understood by reference to an example illustrated in FIG. 3. A mobile station 20 is currently located in a given cell 10(1). The procedure first has the mobile switching center (or other administrative node) 22 select the given frequency ($f_{sel}$) (step 100) which is not allocated to that given cell 10(1). All neighboring cells 10(2)–10(n) within the selected threshold radial distance (i.e., "close by") of the given cell 10(1) which have currently been allocated use of the selected frequency $f_{sel}$ for either a broadcast control channel frequency $F_{BCCH}$ or a traffic channel frequency $f_{TCH}$ are then identified (step 102). A measurement list (ML) 50 is then created (step 104) and sent (step 106) through the serving base station 18 to the mobile station 20. This measurement list 50 contains the broadcast control channel (BCCH) frequencies ($f_{BCCH}$) of each of the identified neighboring cells 10(2)–10(n). Responsive thereto, the certain mobile station 20 makes signal strength measurements (step 108) on the broadcast control channel frequencies $f_{BCCH}$ identified within the measurement list 50. These signal strength measurements are next reported (step 110) back the mobile switching center (administrative node) 22. The reported signal strength measurements are then processed (step 112) to generate a signal strength histogram (H) 52(2)–52(n) for each of the identified neighboring cells 10(2)–10(n), respectively. A selected percentile value (PV) 54(2)–54(n) is then calculated (step 114) for each histogram 52(2)–52(n). A sum is then calculated (step 116) from these percentile values 54(2)–54(n) which represents (i.e., estimates) the downlink interference for the selected frequency $f_{sel}$. In calculating this sum, the percentile value PV of a histogram H for a certain cell is added as it is to the sum if the selected frequency $f_{sel}$ comprises the broadcast control channel frequency $f_{BCCH}$ for that certain cell. This is illustrated for cells (10(2), 10(4) and 10(5). If, on the other hand, the selected frequency $f_{sel}$ comprises the traffic channel frequency $f_{TCH}$ for that certain cell, the percentile value PV of a histogram H for that certain cell minus the appropriate delta value ($\Delta$) is added to the sum. This is illustrated for cells 10(3) and 10(n). Once calculated, the sum estimating downlink interference on the selected frequency $f_{sel}$ may be utilized by a service provider in a number of way, including in connection with frequency planning operations.

Figure 4:
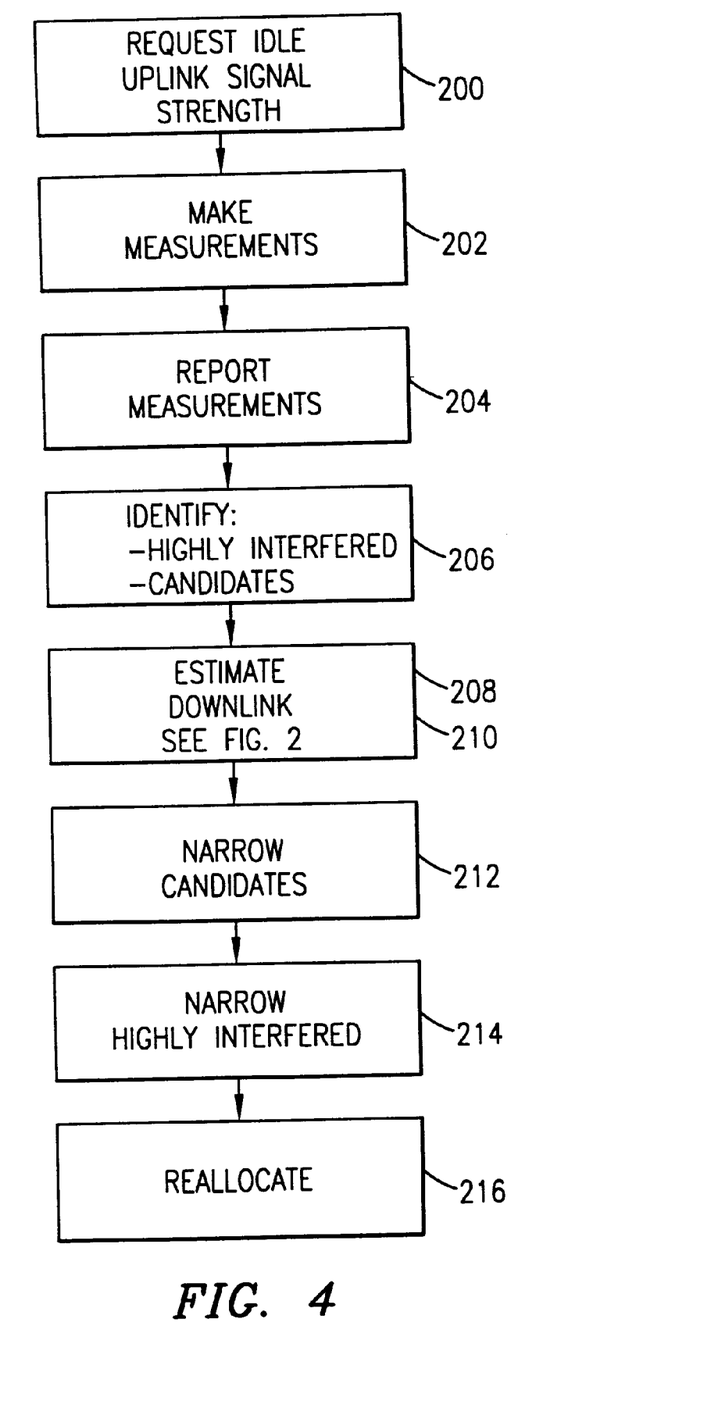
FIG. 4 is a flow diagram for a procedure of the present invention for adaptive channel allocation.

Reference is now made to FIG. 4 wherein there is shown a flow diagram for a procedure of the present invention for adaptive channel allocation. In step 200, base stations are requested to make uplink idle frequency signal strength measurements. These measurements are made in step 202 and reported back to the mobile switching center in step 204. These uplink idle frequency signal strength measurements are then processed in step 206 to identify highly interfered frequency allocations in the current frequency plan as well as to identify candidate frequencies for reallocation. The processing step 206 may be implemented in accordance with any one of a number of well known procedures. Next, for each identified highly interfered frequency, an estimation is made in step 208 of the downlink interference on that frequency. Furthermore, an estimation is made in step 210 of the downlink interference on each of the candidate frequencies. The estimations of both steps 208 and 210 may be implemented using the procedure illustrated in FIG. 2, or any other suitable procedure. The estimations of step 210 are then utilized in step 212 to narrow the number of candidate frequencies to be considered for reallocation in place of each of the highly interfered frequencies. The use of the step 210 estimations in step 212 accordingly functions to identify and eliminate candidate frequencies previously found to have suitable levels of uplink interference but not found to have unacceptable levels of downlink interference. Next, in step 214, the step 208 estimations are utilized in conjunction with the narrowed list of candidate frequencies to narrow the number of highly interfered frequencies that should immediately be considered for reallocation. The use of the step 208 estimations and narrowed list of candidate frequencies in step 214 accordingly functions to identify and eliminate highly interfered frequencies for cells whose interference problems cannot be substantially improved without simultaneously causing other interference problems to arise within the system. This operation thus performs a balancing functionality to select only those instances of highly interfered frequencies where a reallocation would result in maximal benefit to that cell while simultaneously causing minimal system detriment. The rules defining substantial improvement and problems as applied to the step 214 operation may be user (e.g., service provider) selected. Finally, the step 214 identified best reallocations are implemented in step 216.

Although the method and apparatus of the present invention has been illustrated in the accompanying Drawings and described in the foregoing Detailed Description, it will be understood that the invention is not limited to the embodiment(s) disclosed, but is capable of numerous rearrangements, modifications and substitutions without departing from the spirit of the invention as set forth and defined by the following claims.

What is claimed is:

1. A method for estimating downlink interference on a selected frequency $f_{sel}$, comprising the steps of:
   identifying plural neighboring cells close to a given cell which have currently been allocated use of the same selected frequency $f_{sel}$, each of the identified neighboring cells including a broadcast control channel frequency $f_{BCCH}$;
   having a mobile station located in the given cell make downlink signal strength measurements on the broadcast control channel frequencies $f_{BCCH}$ of each one of the neighboring cells identified in the previous step having the same selected frequency $f_{sel}$;
   processing the signal strength measurements to generate a signal strength histogram for each one of the identified neighboring cells;
   mathematically deriving an intermediate value from each of the generated signal strength histograms; and
   summing the derived intermediate values for the histograms associated with each of the neighboring cells to calculate the estimate of the downlink interference on the selected frequency $f_{sel}$.

2. The method as in claim 1 wherein the step of mathematically deriving comprises the step of taking a percentage value of each of the generated signal strength histograms to derive the intermediate values.

3. A method for estimating downlink interference on a selected frequency $f_{sel}$, comprising the steps of:
   identifying neighboring cells close to a given cell which have currently been allocated use of the selected frequency $f_{sel}$;
   having a mobile station located in the given cell to make downlink signal strength measurements on the broadcast control channel frequencies $f_{BCCH}$ of each one of the identified neighboring cells;
   processing the signal strength measurements to generate a signal strength histogram for each one of the identified neighboring cells;
   mathematically deriving an intermediate value from each of the generated signal strength histograms; and
   summing the derived intermediate values for the histograms associated with each of the neighboring cells to calculate the estimate of the downlink interference on the selected frequency $f_{sel}$ wherein the step of summing comprises the steps of:
      adding the derived intermediate value for the histogram associated with a given neighboring cell to the sum as is if the selected frequency $f_{sel}$ in that given neighboring cell comprises the broadcast control channel frequency $f_{BCCH}$ for that given cell; and
      adding the derived intermediate value for the histogram associated with a given neighboring cell to the sum minus an appropriate delta value $\Delta$ if the selected frequency $f_{sel}$ in that given neighboring cell comprises a traffic channel frequency $f_{TCH}$ for that given cell.

4. The method as in claim 1 wherein the step of having comprises the step of sending a measurement list to the mobile station, wherein that measurement list identifies the broadcast control channel frequencies $f_{BCCH}$ of each one of the identified neighboring cells for which downlink signal strength measurements are to be made.

5. The method as in claim 1 wherein the step of identifying comprises the step of selecting neighboring cells which would cause serious interference if allocated use of the selected frequency $f_{sel}$ or a frequency adjacent to the selected frequency $f_{sel}$.

6. A system for estimating downlink interference on a selected frequency $f_{sel}$, comprising:
   a mobile station located in a given cell, the mobile station operating to make and report downlink signal strength measurements on the broadcast control channel frequencies $f_{BCCH}$ of each one of a plurality of neighboring cells identified on a received measurement list; and
   an administrative node operating to:
   generate the measurement list identifying the broadcast control channel frequencies $f_{BCCH}$ for each one of the plurality of neighboring cells, each one of the plurality of neighboring cells being close to the given cell and being currently allocated use of the same selected frequency $f_{sel}$;
   process the reported signal strength measurements to generate a signal strength histogram for each one of the plurality of neighboring cells;
   mathematically derive an intermediate value from each of the generated signal strength histograms; and
   sum the derived intermediate values for the histograms associated with each of the neighboring cells to calculate the estimate of the downlink interference on the selected frequency $f_{sel}$.

7. The system as in claim 6 wherein the operation performed by the administrative node to mathematically derive functions to take a percentage value of each of the generated signal strength histograms as the intermediate values.

8. The system as in claim 6 wherein the administrative node comprises a mobile switching center.

9. The system as in claim 6 wherein the operation performed by the administrative node to generate further comprises operating to select the broadcast control channel frequencies $f_{BCCH}$ of neighboring cells within a certain selected threshold radial distance from the given cell for inclusion on the measurement list.

10. A system for estimating downlink interference on a selected frequency $f_{sel}$, comprising:
    a mobile station located in a given cell, the mobile station operating to make and resort downlink signal strength measurements on the broadcast control channel frequencies $f_{BCCH}$ of each one of a plurality of neighboring cells identified on a received measurement list; and
    an administrative node operating to:
        generate the measurement list identifying the broadcast control channel frequencies $f_{BCCH}$ for the plurality of neighboring cells close to the given cell which have currently been allocated use of the selected frequency $f_{sel}$;
        process the reported signal strength measurements to generate a signal strength histogram for each one of the identified neighboring cells;
        mathematically derive an intermediate value from each of the generated signal strength histograms; and
        sum the derived intermediate values for the histograms associated with each of the neighboring cells to calculate the estimate of the downlink interference on the selected frequency $f_{sel}$ wherein the operation performed by the administrative node to sum further comprises operating to:
            add the derived intermediate value for the histogram associated with a given neighboring cell to the sum as is if the selected frequency $f_{sel}$ in that given neighboring cell comprises the broadcast control channel frequency $f_{BCCH}$ for that given cell; and
            add the derived intermediate value for the histogram associated with a given neighboring cell to the sum minus an appropriate delta value $\Delta$ if the selected frequency $f_{sel}$ in that given neighboring cell comprises a traffic channel frequency $f_{TCH}$ for that given cell.

11. A method for adaptive frequency allocation (AFA), comprising the steps of:
    making uplink idle frequency signal strength measurements on a plurality of currently allocated frequencies and currently unallocated candidate frequencies;
    processing the uplink idle frequency signal strength measurements to identify highly interfered frequency allocations in a current frequency plan as well as identify candidate frequencies for reallocation;
    estimating downlink interference on each of the identified highly interfered frequency and each of the candidate frequencies;
    narrowing of the number of candidate frequencies and highly interfered frequencies that should be considered for immediate reallocation based on the estimated downlink interference to identify best reallocations of candidate frequencies in place of highly interfered frequencies in the current frequency plan assignment to transceivers of a base station for a certain cell; and
    implementing the identified best reallocations to assign certain candidate frequencies to the transceivers of: the certain cell's base station in place of certain highly interfered frequencies.

12. The method as in claim 11 wherein the step of estimating downlink interference comprises the steps of:
    identifying plural neighboring cells close to a given cell which have currently been allocated use of a selected highly interfered or candidate frequency $f_{sel}$, each of the identified neighboring cells including a broadcast control channel frequency $f_{BCCH}$;
    having a mobile station located in the given cell make downlink signal strength measurements on the broadcast control channel frequencies $f_{BCCH}$ of each one of the identified neighboring cells identified in the previous step having the same selected frequency $f_{sel}$;
    processing the signal strength measurements to generate a signal strength histogram for each one of the identified neighboring cells;
    mathematically deriving an intermediate value from each of the generated signal strength histograms; and
    summing the derived intermediate values for the histograms associated with each of the neighboring cells to calculate the estimate of the downlink interference on the selected frequency $f_{sel}$.

13. The method as in claim 12 wherein the step of mathematically deriving comprises the step of taking a percentage value of each of the generated signal strength histograms to derive the intermediate values.

14. The method as in claim 12 wherein the step of summing comprises the steps of:
    adding the derived intermediate value for the histogram associated with a given neighboring cell to the sum as is if the selected frequency $f_{sel}$ in that given neighboring cell comprises the broadcast control channel frequency $F_{BCCH}$ for that given cell; and
    adding the derived intermediate value for the histogram associated with a given neighboring cell to the sum minus an appropriate delta value $\Delta$ if the selected frequency $f_{sel}$ in that given neighboring cell comprises a traffic channel frequency $f_{TCH}$ for that given cell.

15. The method as in claim 12 wherein the step of having comprises the step of sending a measurement list to the mobile station, wherein that measurement list identifies the broadcast control channel frequencies $f_{BCCH}$ of each one of the identified neighboring cells for which downlink signal strength measurements are to be made.

16. The method as in claim 12 wherein the step of identifying comprises the step of selecting neighboring cells which would cause serious interference if allocated use of the selected frequency $f_{sel}$ or a frequency adjacent to the selected frequency $f_{sel}$.

17. The method as in claim 11 wherein the step of narrowing comprises the steps of:
    identifying and eliminating candidate frequencies having acceptable uplink interference measurements but unacceptable downlink interference estimates; and
    identifying and eliminating highly interfered frequencies for cells having interference problems that cannot be substantially improved without simultaneously causing collateral interference problems.

18. A system for adaptive frequency allocation (AFA), comprising:

base stations operating to make and report uplink idle frequency signal strength measurements on a plurality of currently allocated frequencies and currently unallocated candidate frequencies; and an administrative node operating to:

process the reported uplink idle frequency signal strength measurements to identify highly interfered frequency allocations in a current frequency plan as well as identify candidate frequencies for reallocation;

estimate downlink interference on each of the identified highly interfered frequency and each of the candidate frequencies;

narrow the number of candidate frequencies and highly interfered frequencies that should be considered for immediate reallocation based on the estimated downlink interference to identify best reallocations of candidate frequencies in place of highly interfered frequencies in the current frequency plan assignment to transceivers of a base station for a certain cell; and implement the identified best reallocations to assign certain candidate frequencies to the transceivers of the certain cell's base station in place of certain highly interfered frequencies.

19. The system as in claim 18 further including:

a mobile station located in a given cell, the mobile station operating to make and report downlink signal strength measurements on the broadcast control channel frequencies $f_{BCCH}$ of each one of a plurality of neighboring cells identified on a received measurement list; and wherein the administrative node further operates to:

generate the measurement list identifying the broadcast control channel frequencies $f_{BCCH}$ for the plurality of neighboring cells close to the given cell and being currently allocated use of a same selected highly interfered or candidate frequency $f_{sel}$;

process the reported signal strength measurements to generate a signal strength histogram for each one of the neighboring cells;

mathematically derive an intermediate value from each of the generated signal strength histograms; and sum the derived intermediate values for the histograms associated with each of the neighboring cells to calculate the estimate of the downlink interference on the selected frequency $f_{sel}$.

20. The system as in claim 19 wherein the operation performed by the administrative node to mathematically derive functions to take a percentage value of each of the generated signal strength histograms as the intermediate values.

21. The system as in claim 19 wherein the administrative node comprises a mobile switching center.

22. The system as in claim 19 wherein the operation performed by the administrative node to generate further comprises operating to select the broadcast control channel frequencies $f_{BCCH}$ of neighboring cells which would cause serious interference if allocated use a same frequency or an adjacent frequency as the given cell for inclusion on the measurement list.

23. The system as in claim 19 wherein the operation performed by the administrative node to sum further comprises operating to:

add the derived intermediate value for the histogram associated with a given neighboring cell to the sum as is if the selected frequency $f_{sel}$ in that given neighboring cell comprises the broadcast control channel frequency $f_{BCCH}$ for that given cell; and add the derived intermediate value for the histogram associated with a given neighboring cell to the sum minus an appropriate delta value $\Delta$ if the selected frequency $f_{sel}$ in that given neighboring cell comprises a traffic channel frequency $f_{TCH}$ for that given cell.

24. The system as in claim 18 wherein the operation performed by the administrative node to narrow comprises operating to:

identify and eliminate candidate frequencies having acceptable uplink interference measurements but unacceptable downlink interference estimates; and identify and eliminate highly interfered frequencies for cells having interference problems that cannot be substantially improved without simultaneously causing collateral interference problems.

* * * * *